United States Patent
Haddad et al.

(10) Patent No.: US 7,907,948 B2
(45) Date of Patent: Mar. 15, 2011

(54) PROVIDING ANONYMITY TO A MOBILE NODE IN A SESSION WITH A CORRESPONDENT NODE

(75) Inventors: Wassim Haddad, Montreal (CA); Suresh Krishnan, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1333 days.

(21) Appl. No.: 11/396,706

(22) Filed: Apr. 4, 2006

(65) Prior Publication Data

US 2007/0189250 A1    Aug. 16, 2007

Related U.S. Application Data (60) Provisional application No. 60/673,786, filed on Apr. 22, 2005, provisional application No. 60/685,396, filed on May 31, 2005.

(51) Int. Cl.
*H04W 36/00* (2009.01)

(52) U.S. Cl. ............ 455/436; 455/432.1; 455/440; 455/439; 455/452.2; 370/331; 370/397; 370/395.52; 370/399; 709/229; 709/230; 713/155; 713/161

(58) Field of Classification Search .......... 455/456.1; 370/338, 351, 332, 349, 395.52, 397, 399; 709/225–230; 713/155, 161, 163–168, 171, 713/182

See application file for complete search history.

(56) References Cited

U.S. PATENT DOCUMENTS

| | | | |
|---|---|---|---|
| 6,055,316 A | 4/2000 | Perlman et al. | 380/262 |
| 6,879,690 B2* | 4/2005 | Faccin et al. | 380/247 |
| 7,389,412 B2* | 6/2008 | Sharma et al. | 713/153 |
| 7,401,216 B2* | 7/2008 | Arkko et al. | 713/153 |
| 7,453,851 B2* | 11/2008 | Westphal et al. | 370/331 |
| 2002/0120844 A1* | 8/2002 | Faccin et al. | 713/168 |
| 2002/0133607 A1* | 9/2002 | Nikander | 709/229 |
| 2002/0147820 A1* | 10/2002 | Yokote | 709/229 |
| 2004/0105408 A1* | 6/2004 | Suh et al. | 370/331 |
| 2004/0157619 A1* | 8/2004 | Corson et al. | 455/456.1 |
| 2004/0179688 A1* | 9/2004 | Lee | 380/270 |
| 2004/0236937 A1* | 11/2004 | Perkins et al. | 713/150 |
| 2005/0044362 A1* | 2/2005 | Haddad et al. | 713/170 |
| 2006/0050671 A1* | 3/2006 | Kim | 370/338 |
| 2010/0023765 A1* | 1/2010 | Le et al. | 713/168 |

FOREIGN PATENT DOCUMENTS

WO    20040001520 A2    12/2003

OTHER PUBLICATIONS

RFC 3775 "Mobility support IPv6" Johnson et al. Jun. 2004.*
PCT Search Report, dated Dec. 29, 2006 received in corresponding PCT application PCT/IB2006/051233.
D. Johnson et al., Mobility Support in IPv6, Network Working Group, RFC 3775, Jun. 2004.

(Continued)

*Primary Examiner* — Kamran Afshar
*Assistant Examiner* — Babar Sarwar (57) ABSTRACT

A method, a correspondent node and a mobile node provide anonymity and unlinkability to a mobile node in a session with a correspondent node. Sequence values, calculated based on secret data, are added to updates sent from the mobile node towards the correspondent node and are used by the correspondent node to authenticate updates from the mobile node. A home address of the mobile node is not explicitly disclosed. An expected care-of address is calculated at the correspondent node and used by the correspondent node to send data packets to the mobile node.

16 Claims, 8 Drawing Sheets

OTHER PUBLICATIONS

G. Montenegro et al., Crypto-Based Identifiers (CBIDs): Concepts and Applications, ACM Transactions on Information and System Security, vol. 7, No. 1, Feb. 2004, pp. 97-127.

T. Hiller et al., Diameter Support for Authentication and Key Agreement (AKA), Authentication, Authorization and Accounting, Internet Draft, Feb. 2001.

* cited by examiner

PROVIDING ANONYMITY TO A MOBILE NODE IN A SESSION WITH A CORRESPONDENT NODE

PRIORITY STATEMENT UNDER 35 U.S.C. S.119(e) & 37 C.F.R. S.1.78

This non-provisional patent application claims priority based upon the prior U.S. provisional patent application entitled "Anonymity Extension for the Optimized Mobile IPv6 (OMIPv6) Protocol", application No. 60/673,786, filed Apr. 22, 2005, in the names of Wassim Haddad and Suresh Krishnan, and upon the prior U.S. provisional patent application entitled "Mobility Support for Multi-Homed Nodes", application No. 60/685,396, filed May 31, 2005, in the name of Wassim Haddad.

BACKGROUND OF THE INVENTION

1. Field of the Invention

The present invention relates to a method, a mobile node and a correspondent node, for supporting anonymity of the mobile node while in a session with the correspondent node.

2. Description of the Related Art

Figure 1:
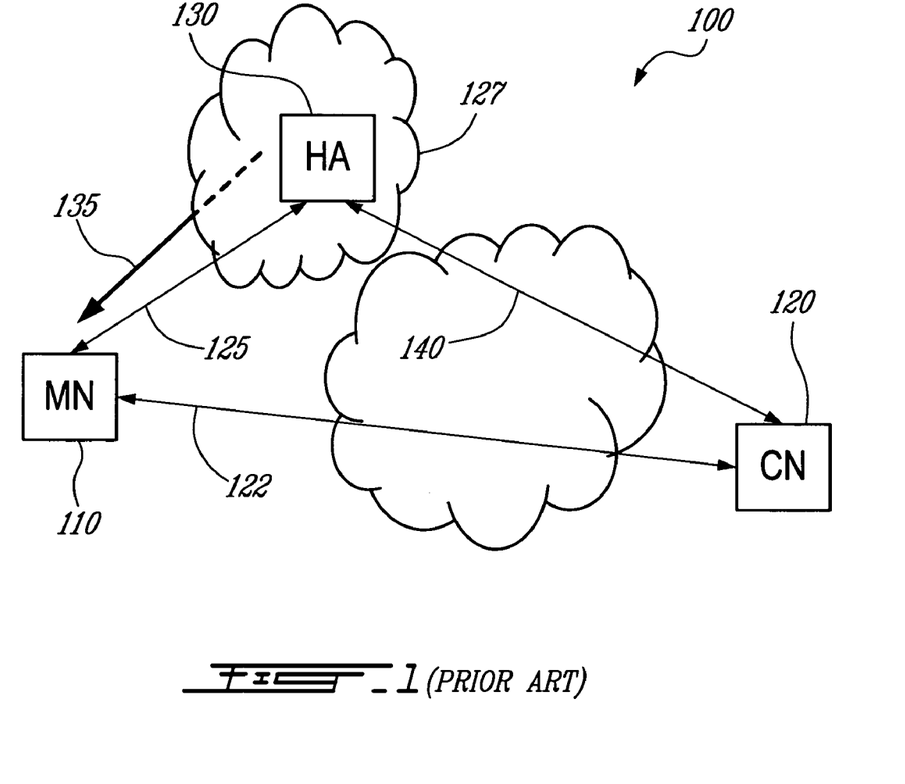
FIG. 1 is a prior art representation of a Mobile Internet Protocol version 6 architecture.

Mobile IP version 4 (Mobile IPv4, Mobile IP, MIPv4 or MIP) and the current version of Mobile IPv6 (MIPv6) are built to provide mobility to a host or Mobile Node (MN). The other nodes, usually referred to as Correspondent Nodes (CN), are usually seen as fixed hosts. Reference is now made to FIG. 1, which shows a MIPv6 network architecture as suggested by the current MIPv6 specification found in an Internet Engineering Task Force (IETF)'s Request For Comment (RFC) number 3775. As can be seen in FIG. 1, an IP network 100 comprises a MN 110 in communication with a CN 120 on a link that provides a direct path 122. The direct path 122 is unlikely to be composed of only one direct physical connection, but rather represents a series of links between routing equipments transparently enabling the communication therebetween. The way the series of links is used to transport traffic between the MN 110 and the CN 120 is irrelevant as long as IP communication therebetween can be established.

The MN 110 has a permanently assigned, 128-bit home address valid in its home network 127, which home address is allocated upon initialization of the MN 110 in the home network 127. The home address comprises a subnet prefix, which is 64-bit long, and an interface identifier, which is also 64-bit long. The allocation mechanism is well-known in the prior art. The MN 110 is further in communication with a Home Agent (HA) 130 located in its home network 127. Among other functionalities, the HA 130 keeps record of a foreign address of the MN 110 valid outside the home network 127. The foreign address is called Care-of-Address (CoA) in the context of MIPv6, and also comprises 128 bits. The CoA assigned to the MN 110 changes in time as the MN 110 moves from one network to another. The record kept by the HA 130, referred to as binding in the context of MIPv6, ties the CoA to the home address. A Binding Cache Entry (BCE) comprising the home address and the CoA of the mobile node is also kept in the CN 120 for the purpose of reaching the MN 110. The HA 130 is also responsible for routing traffic received at the home address to the MN 110. The traffic received is forwarded by the HA 120 on a link 125 toward the MN 110. All traffic sent on the link 125, in accordance with MIPv6, is encrypted to ensure, among other things, confidentiality of credentials periodically exchanged between the MN 110 and the HA 130.

The following lines summarize how the MIPv6 concept applies in a typical situation. For example, the MN 110 is in bidirectional IP session, with the CN 120 on the direct path 122. When the MN 110 moves from a first home network to a visited network, as illustrated by an arrow 135 on FIG. 1, the MN 110 acquires a first CoA. This modification in addressing state of the MN 110 must be advertised to the CN 120. In order to advertise the acquisition of its first CoA, the MN 110 sends a first BU, comprising the HoA, the first CoA and a 64-bit sequence number (SQN), to the CN 120 on the direct path 122. The CN 120, upon reception of the first BU creates a BCE for the session, where it stores the HoA, the first CoA and the SQN. The CN 120 then sends a first BA to the MN 110. Reception of the first BA at the MN 110 indicates a successful completion of the advertisement of the modification of the addressing state.

When the MN 110, while the session is still ongoing, moves to a second visited network, it acquires a second CoA and sends to the CN 120 a second BU carrying the second CoA. The second BU also comprises the HoA and a new SQN, whose value is monotonically increased over the earlier SQN. The CN 120 recognizes the BCE for the session by use of the HoA. The CN 120 updates the BCE by overwriting the first CoA with the second CoA and by overwriting the SQN with the newly received SQN. The CN 120 refuses the second BU if it comprises a SQN that is not monotonically increased over the sequence value previously stored in the BCE. The SQN is meant to provide a protection against a malicious node that might want to overtake the session by sending a BU with the HoA of the MN 110 and a different CoA for the malicious node. The malicious node might not send the proper SQN and thereby be detected. However, the protection offered by the SQN is marginal at best: a malicious node may send any number of false BUs with various SQN values until one BU is accepted and responded with a BA.

Another problem with the aforementioned method of informing the CN 120 of movements of the MN 110 is that the HoA and the various CoA values assigned to the MN 110 are disclosed on the direct path 122 carrying the various BU messages. A malicious node located on this path would be able to identify the MN 110 and to trace in real time its movements across the Internet. This type of activity would constitute a serious violation of the privacy of the MN 110.

There would be clear advantages of having a method, a mobile node and a correspondent node for providing a capability for the correspondent node to avoid disclosing an identity of the mobile node to any third party and to avoid an attack from a node pretending to be the legitimate mobile node.

SUMMARY OF THE INVENTION

It is therefore a broad object of this invention to provide a method, a mobile node and a correspondent node for providing anonymity and unlinkability to the mobile node while in a session with the correspondent node. Update messages sent from the mobile node to the correspondent node comprise a sequence value, known only by the mobile node and the correspondent node, which cannot be predicted by a malicious third party.

A first aspect of the present invention is directed to a method to provide unlinkability to a mobile node that sends update messages to a correspondent node while the correspondent node and the mobile node are in a session. A first update comprises a sequence value set by the mobile node. The correspondent nodes calculates an expected sequence value, using an algorithm based at least in part on the received sequence value, and stores it in a table entry for the session.

Upon sending a second update, the mobile node calculates a new sequence value, using the same algorithm and the same preceding sequence value as used by the correspondent node upon receipt of the first update. The correspondent node receives the second update comprising the new sequence value and uses it to locate the table entry. The correspondent node accepts the second update if the received new sequence value matches an expected sequence value in a table entry. The finding of the table entry comprising the expected sequence value that matches the received new sequence value authenticates the second update. Other data in the second update, for instance comprising new address data, is used to update the content of the table entry.

A second aspect of the present invention is directed to a method to hide a home address of the mobile node in update messages.

A third aspect of the present invention is directed to a method to further provide anonymity of the mobile node in a session by changing a value of an address sent to the correspondent node at every update.

A fourth aspect of the present invention is directed to a mobile node for preserving anonymity and unlinkability from potential malicious third parties.

A fifth aspect of the present invention is directed to a correspondent node for providing to a mobile node anonymity and unlinkability from potential malicious third parties.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method, a mobile node (MN) and a correspondent node (CN) to provide anonymity and unlinkability to the MN while in a session with the CN. Whether or not the MN is located in a home network when the session is first set up, the MN sends an update to the CN to request the creation of a table entry for the session. If the MN is located in a foreign network, it acquires a care-of address (CoA) from the foreign network and sends it in the update. The CN stores the CoA in its table entry. If however the MN is located in its home network, it sends its home address (HoA) as a "pseudo CoA", as if this address was a CoA. Otherwise stated, the MN of the present invention acts upon the CN as if it was always located in a foreign network, in order to always set up the table entry at the CN.

The MN of the present invention does not disclose its HoA when the MN is in a foreign network. It also pretends that its HoA is a CoA when it is located in its home network. The value of the resulting "pseudo CoA" changes with every update. Therefore, the CN is not capable of relying on a stable HoA value of the MN to identify the table entry for the session. A new pointer to identify the table entry is now required. The MN and the CN of the present invention use a new sequence value (SQV) to replace the sequence number (SQN). The SQV is not increased monotonically from one update to the next. The SQV, which has a same 64-bit length as the SQN, is rather recalculated with every new update by use of secret information known only by the MN and the CN. This prevents a third, malicious party, from following a trace of the various updates for trying to follow a monotonically increasing SQN value. In an aspect of the present invention, the SQV is sent by the MN in each new update. The CN uses the received SQV to locate the table entry for the ongoing session with the MN. Indeed, the SQV is now used at the CN as the new pointer to identify the table entry for the session.

The MN and the CN of the present invention also use secret information known only by themselves to modify address values of the MN. This further provides privacy and anonymity to the MN.

In the context of the present invention, the MN may comprise a mobile cellular telephone, a personal assistant, a laptop computer and the like, wherein the MN comprises at least one access interface and preferably supports MIPv6.

The CN may be a server, for instance a web server or a Session Initiation Protocol (SIP) server, or any computer. The CN could also be another MN, which may optionally itself be another MN. The CN preferably supports MIPv6.

Figure 2:
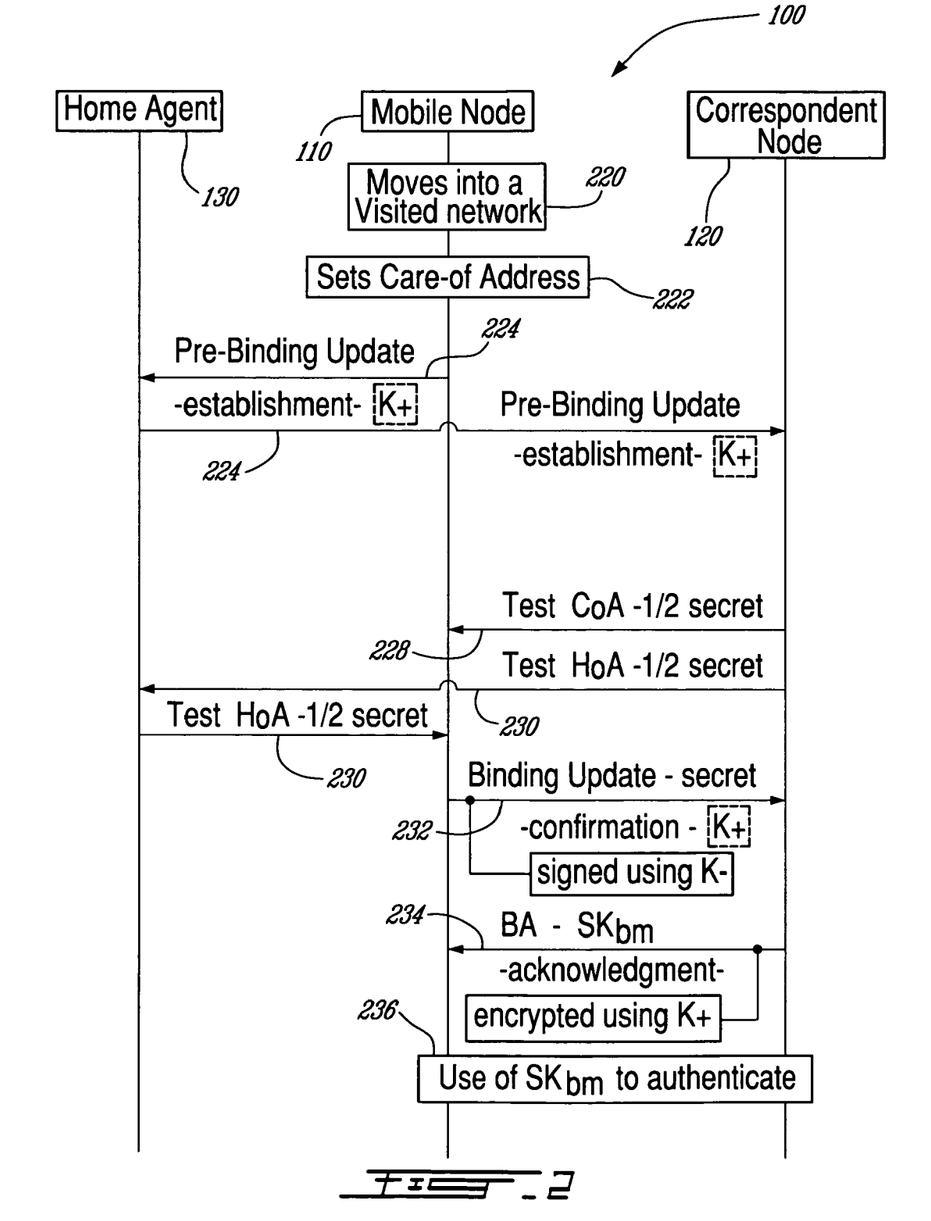
FIG. 2 shows a representation of a method to setup a session with a secret authentication key between a mobile node and a correspondent node.

In order to provide a basis for a description of the preferred embodiment of the present invention, reference is now made to FIG. 2 which shows a representation of a method to setup a session with a secret authentication key between the MN and the CN. The MN 110 is associated with a home network, which is a home portion of the IPv6 network 100 (also referred to as home network 127). The MN 110 has a first IPv6 address or HoA valid in the home portion of the IPv6 network 100. The HoA also serves to associate the MN 110 to a Home Agent (HA) 130 located in the home network. The HA is a node in the home network wherein the MN has a subscription. When the subscription for the MN 110 is established in the home network, the HA 130 defines the HoA and allocates it to the MN 110. All traffic addressed to the HoA is first routed to the HA 130, which forwards it to the MN 110.

The MN 110 has also a pair of asymmetric keys comprising a private key (K−) and a public key (K+). The detailed functioning of double key encryption is well-known in the prior art. It is taken for granted that ownership of the K+ by the MN 110 is provable. The proof of ownership can be done, for example, using a Certificate Authority, which is a trustable third party ensuring ownership of the K+. Another solution, which does not require the use of a third party is to use the K+ already used for other cryptographic mechanisms. An example of such a mechanism is the cryptographically generated address (CGA) mechanism, which also enables proof of ownership of an IPv6 address generated therewith.

When the MN 110 moves into a visited portion of the IPv6 network 100 (step 220), a second IPv6 address or Care-of Address (CoA), valid in the visited portion, is provided to the MN 110 by a serving node of the visited portion (step 222). The CoA is set in addition to the HoA. The CoA is used to reach the MN 110 directly. The way in which the CoA is set for the MN 110 is well-known in the art.

The MN 110 needs to inform the CN 120 of its newly acquired CoA. This is achieved by sending an establishment message 224 from the MN 110 addressed to the CN 120 through the HA 130 (i.e. routed from the HA 130 towards the CN 120). The establishment message 224 may also be referred to as a Pre-Binding Update or PBU. The establishment message 224 advertises the CoA. The establishment message comprises the HoA and the CoA of the MN and, may further comprise the K+ of the MN.

Upon reception of the establishment message 224, the CN 120 tests the reachability of the CoA and the reachability of the HoA of the MN 110. This is achieved by sending from the CN 120 a first address test 228 to the MN 110 addressed to the HoA. A second address test 230 addressed to the CoA is sent from the CN 120.

Upon reception of the first address test 228 and the second address test 230, the MN 110 sends a single update 232. The update 232 is signed by the MN 110 using the K−. The update 232 may also be referred to as a Binding Update (BU). The HoA, the CoA and a SQN are included in the update 232. As the update 232 is the first update sent for this session, the SQN may be set to any value by the MN 110.

Reception of the update 232 at the CN 120 completes the test of the CoA and HoA. Upon receiving the update 232, the CN 120 creates a BCE where it stores the HoA, the CoA and the SQN.

The CN 120 further sends an acknowledgement 234 to the MN 110 addressed to the CoA. The acknowledgement 234 comprises a secret authentication key (SKbm) encrypted in the acknowledgement 234 using the K+ of the MN 110. The SKbm is likely to be generated by the CN 120. The acknowledgement 234 may also be referred to as a Binding Acknowledgment (BA). Upon reception of the acknowledgement 234, the MN 110 decrypts the SKbm using the K−. Thereafter, both the CN 120 and the MN 110 have the same SKbm to authenticate the communication therebetween at step 236.

The K+ of the MN 110 may be advertised either by sending the K+ in the establishment message 224, in the update 232, or in any combination of messages 224 and 232.

Figure 3A:
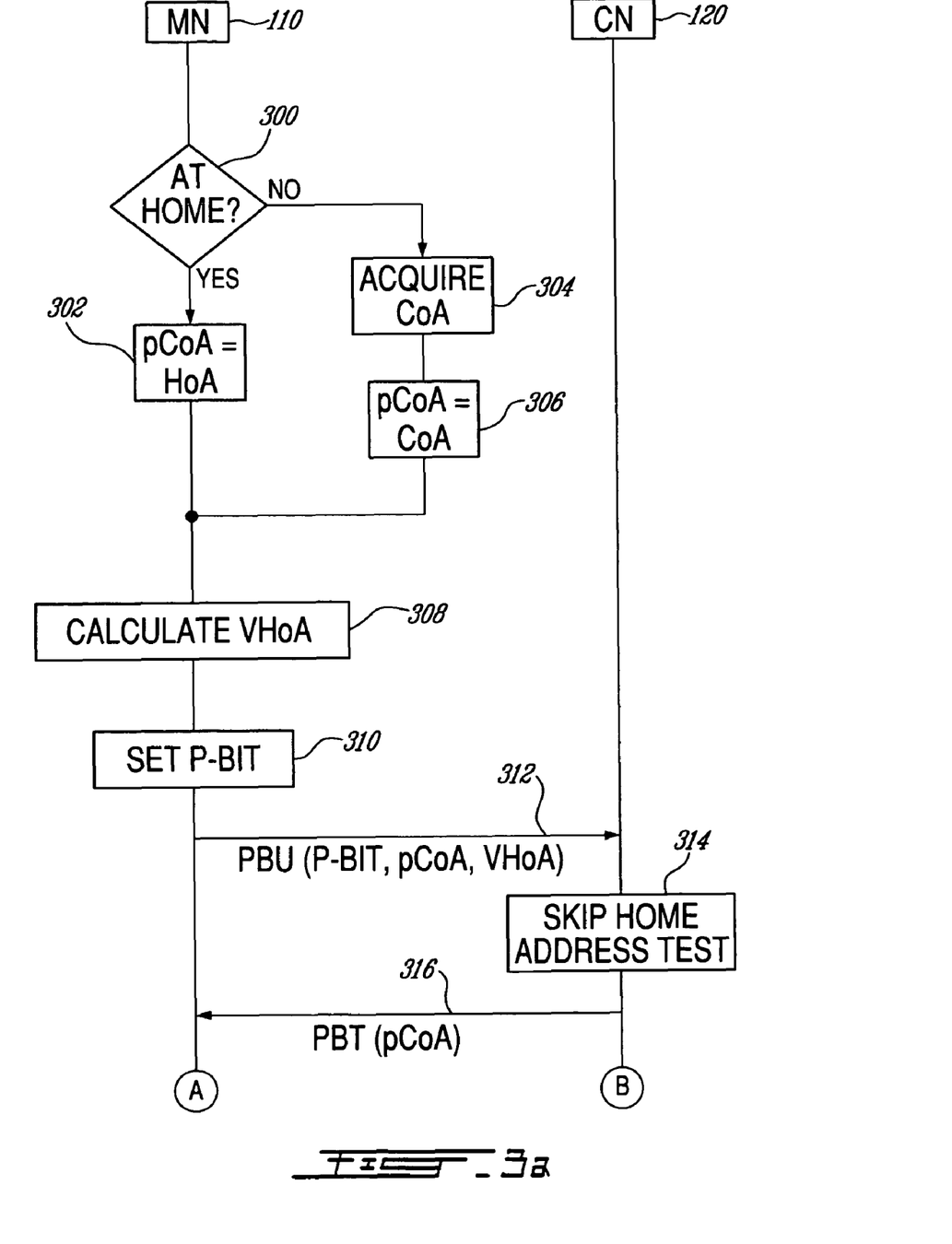
FIGS. 3a, 3b, 3c and 3d show a sequence diagram of an exemplary method for providing anonymity to a mobile node in a session with a correspondent node.

Having now described hereinabove a general method of setting up a session between the MN and the CN, an aspect of the preferred embodiment of the present invention will now be described by reference to FIGS. 3a, 3b, 3c and 3d which show a sequence diagram of an exemplary method for providing anonymity to a mobile node in a session with a correspondent node. It is first determined at step 300, prior to the establishment of a session, whether the MN 110 is in a home network or in a foreign network. If the MN 110 is in the home network, it sets a pseudo care-of address (pCoA) equal to its home address (HoA) at step 302. If the MN 110 is in a foreign network, it must first acquire a care-of address (CoA) at step 304 and then set its pCoA equal to the CoA at step 306. The MN 110 then calculates a Virtual Home Address (VHOA) at step 308. The preferred method for calculating the VHoA is using a well-known hashing mechanism, wherein the VHOA is calculated as per equation (1):

$$VHoA = SHA(pCoA) \quad (1)$$

Where:
"SHA" is a hashing function.

Other methods of computing the VHOA are also possible. This includes using other hashing mechanisms, besides the well-known Secure Hash Standard (SHA) algorithm. It is preferable, for privacy reasons, that the actual HoA or CoA assigned to the MN 110 cannot be easily detected by analysis of the VHoA value obtained at step 308.

The MN 110 further sets a privacy indication, or P-bit, at step 310. The MN 110 then sends to the CN 120 an establishment message, for instance a Pre-Binding Update (PBU) message in the context of an MIPv6 implementation, at step 312. The establishment message comprises the VHOA and the pCoA, and, preferably, the P-bit.

While the establishment message as shown in FIG. 2 comprised the HoA and the CoA of the MN 110, this establishment message differs in the type of addresses sent therein. The VHOA that is sent instead of the HoA is not a routable address. The pCoA that is sent instead of the CoA is a routable address and may actually have a value equal to the HoA or to the CoA.

Figure 3B:
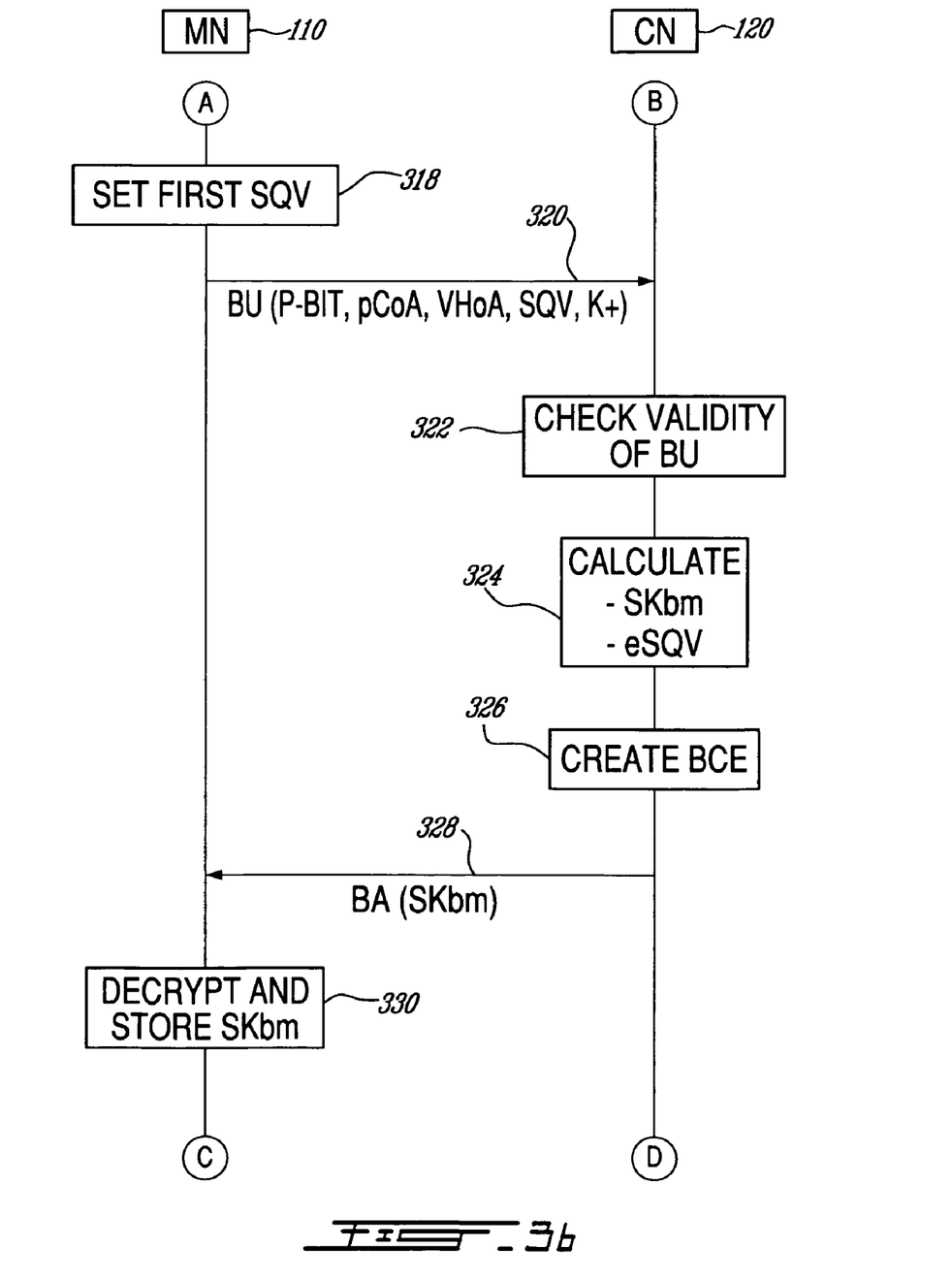

The CN 120 receives the establishment message at step 312. At step 314, the CN 120 knows from the presence of the P-bit that the VHoA is not a real home address and thus decides to skip any home address test. Without the P-bit, the CN 120 might attempt to make a home address test, detect a failure, determine based on the failure that the VHoA is not a real home address, and simply continue with the next step. The P-bit is therefore an optional aspect of the present invention. At step 316, the CN 120 sends a care-of address test, or Pre-Binding Test (PBT) in the context of an MIPv6 implementation, towards the MN 110.

At step 318, the MN 110 sets a first sequence value (SQV) for the session. The value of the SQV may be set to any value at this time, but it is preferably chosen so that it matches a format of a standard field, such as for example the sequence number (SQN) of a Binding Update (BU) in MIPv6. The MN 110 sends towards the CN 120 at step 320 an update, such as a BU message, comprising the P-bit, the pCoA, the VHoA, the SQV and, preferably, a public key (K+) of the MN 110. In an alternate aspect of the preferred embodiment of the invention, the pCoA may be modified by overwriting its 64 lower significant bits, comprising an interface identifier part, by the SQV. In this case, the SQV is advantageously sent only as a part of the pCoA. At step 322, the CN 120 preferably verifies the authenticity of the BU message by use of the K+. The CN 120 calculates a shared secret key (SKbm) at step 324. The CN 120 also calculates an expected sequence value (eSQV), preferably based on the SKbm and on the received SQV, as per equation (2):

$$eSQV = SHA((SQV) + First(128, SHA(SKbm))) \quad (2)$$

Where:
"SQV" is the previous SQV, i.e., SQV received in the last update;
"First (size, input)" is a function used to indicate truncation of the input data so that only the first size bits remain to be used.

Other methods of calculating the eSQV would also fall within the scope of the present invention, inasmuch as the eSQV value cannot be easily predicted from the SQV value.

At step 326, the CN 120 creates a table entry for the session with the MN 110, the table entry being a Binding Cache Entry (BCE) in the context of an MIPv6 implementation. The table entry stores the eSQV, the pCoA, the VHOA, the K+ and the SKbm. At step 328, the CN 120 sends an acknowledgement towards the MN 110, comprising the SKbm. In the context of an MIPv6 implementation, the acknowledgement would take the form of a Binding Acknowledgement (BA). The MN 110 decrypts and stores the SKbm at step 330. Thereafter, as shown at step 332, the CN 120 may send data packets towards the MN 110 using the pCoA as a routing address. Data packets are preferably encrypted by use of the SKbm.

Figure 3C:
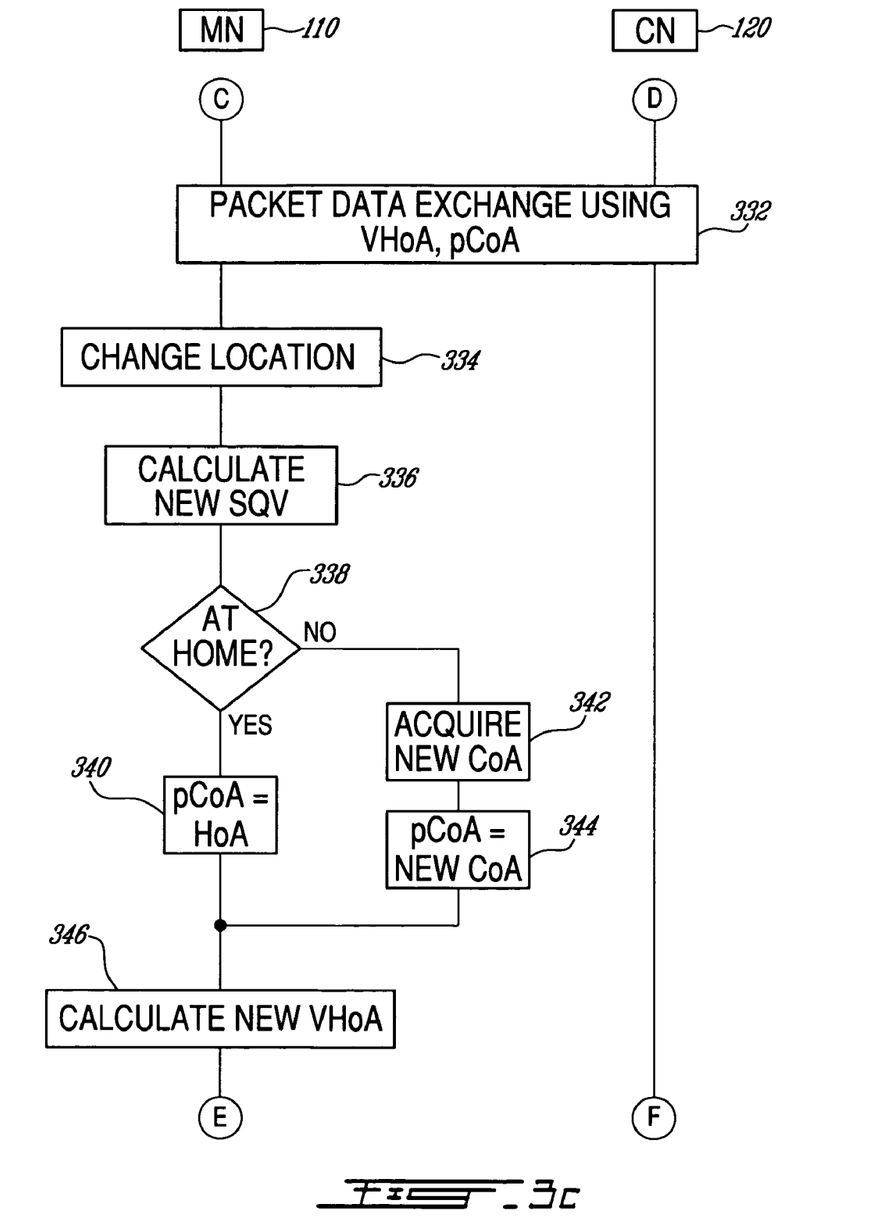

At step 334, the MN 110 changes location while the session with the CN 120 is still ongoing. The MN 110 calculates a new SQV at step 336, using the same method as used by the CN 120 at step 324, which preferably uses equation (2). The MN 110 then sets a new value for the pCoA at steps 338, 340, 342 and 344, in the same manner as when the session was initially set. In a same manner as in the case of the first update, the pCoA may optionally be modified by overwriting its 64 lower significant bits with the new SQV. In this case also, the SQV is only sent as a part of the pCoA. Because the MN 110 changed location at step 334, the new pCoA is necessarily different from the previous value assigned to the pCoA. A new value of the VHoA is calculated at step 346, reusing the same method as in step 308.

The MN 110 sends towards the CN 120 at step 348 a new update, comprising the same P-bit and the new values for the pCoA, VHoA and SQV. Preferably, the K+ is also included.

At step 350, the CN 120 tries to find a table entry wherein the eSQV value matches, or is equal to, the newly received SQV. If none is found, the update message is ignored and the process ends at step 352. A found match is indicative that the CN 120 has properly authenticated the newly received update message because an SQV with an equal value could only be calculated by the MN 110 by use of secret information. The CN 120 calculates new values to be entered in the table entry at step 354. A new eSQV value is calculated in the same manner as in step 324, based on the newly received SQV. An expected care-of address (eCoA) is calculated, also at step 354, as per equation (3):

$$eCoA(iid) = First(64, SHA((SHA(SKbm)|pCoA\text{Subnet Prefix}))) \quad (3)$$

Where:
"iid" is the interface identifier part of the eCoA;
"pCoA" is the MN's pseudo care-of address sent in the update; and
"pCoA Subnet Prefix" becomes a subnet prefix of the eCoA.

The eCoA value needs to remain a routable IP address. Equation (3) calculates the interface identifier part of the required eCoA. The actual eCoA value is obtained from prepending the eCoA(iid) value to the pCoA subnet prefix. Hence, the eCoA comprises a routable subnet prefix and only the iid part has been modified.

Still at step 354, an expected virtual home address (eVHoA) is calculated as per equation (4):

$$eVHoA = SHA(eCoA) \quad (4)$$

The eCoA and eVHoA could be computed with other methods, as long as the values obtained confer reasonable anonymity to the MN 110 and as long as the eCoA preserves the subnet prefix from the pCoA. In the preferred embodiment, the mechanism to calculate the eVHoA, as set forth in equation (4), is identical to the mechanism to calculate the VHoA, as in equation (1).

Figure 3D:
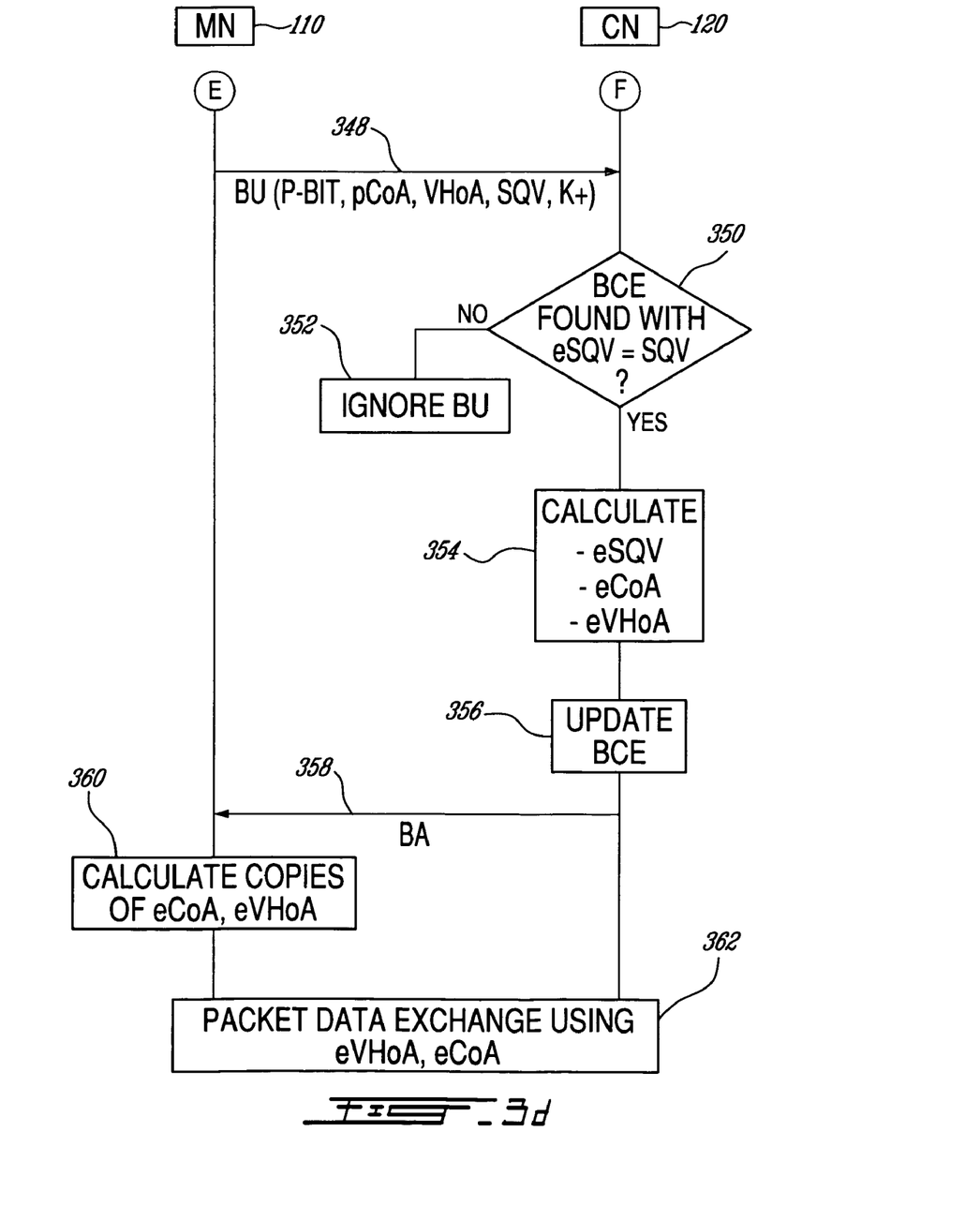

The CN 120 updates the table entry at step 356 by overwriting the previous eSQV with the new value for the eSQV, overwriting the previous pCoA with the eCoA, and overwriting the previous VHoA with the eVHoA.

At step 358, the CN 120 sends a new acknowledgement towards the MN 110. Responsive to receipt of the new acknowledgement, the MN 110 calculates at step 360 a copy of the eCoA and a copy of the eVHoA, using identical algorithms as those used by the CN 120.

Thereafter, as shown at step 362, the CN 120 may send data packets towards the MN 110 using the eCoA as a routing address.

From the above description of FIGS. 3a-3d, it can be seen that the real identity of the MN 110 is, as much as possible, not disclosed to the CN or to any malicious eavesdropper. If the MN 110 has first established the session from its home network, its home address was only disclosed in the first update where it was pretending to be a care-of address. Subsequent updates, indicative of a mobile node's movements and activities, would not be linkable or correlatable by malicious eavesdropper because the present invention uses sequence values that are not monotonically incremented. Likewise, high jacking of the session by sending an update from a third party becomes practically impossible because the third party cannot predict the next sequence value that will be accepted by the CN 120.

Figure 4:
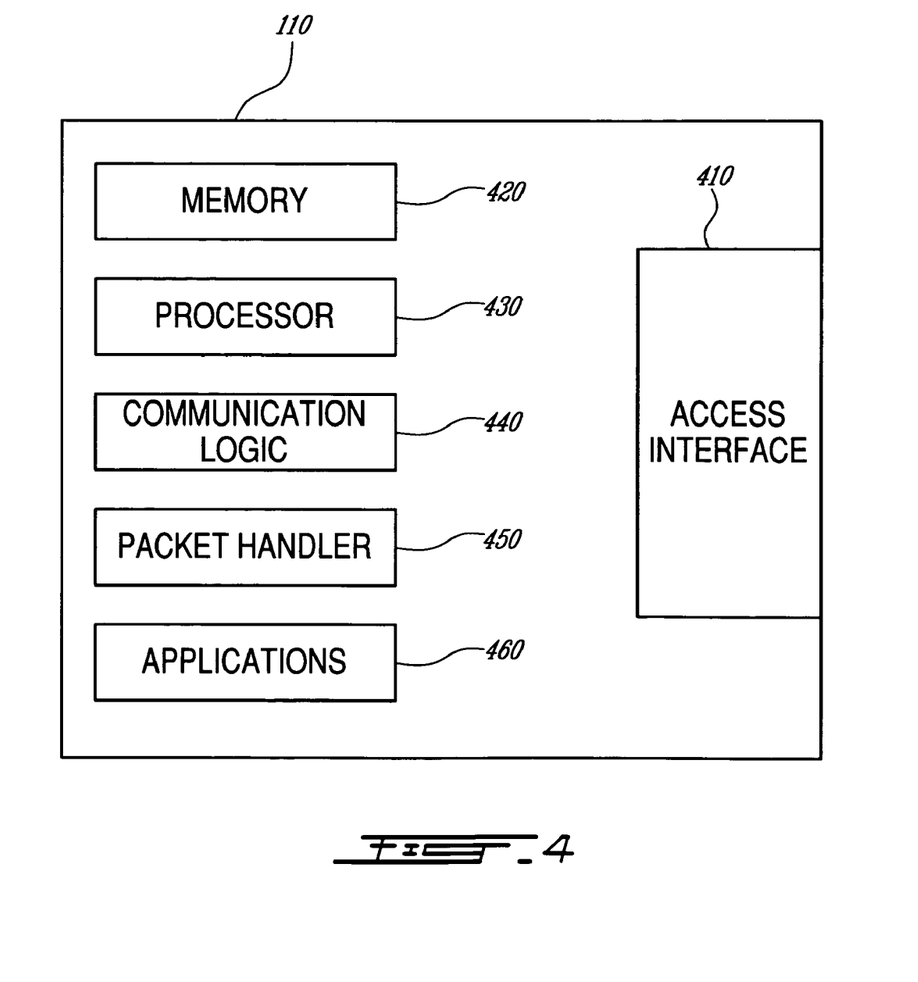
FIG. 4 shows an exemplary mobile node built according to the present invention.

An exemplary construction of an MN 110 as used in the preceding figures, will now be described by reference to FIG. 4, which shows an exemplary MN 110 built according to the present invention. The MN 110 may be implemented in hardware, software, or any combination thereof. The MN 110 comprises an access interface 410, a memory 420, a processor 430, a communication logic 440, a packet handler 450 and applications 460.

The access interface 410 is used to communicate with CNs through a connection to home networks and, when away from a home network, through a connection to foreign networks. In an exemplary MN 110, access interface 410 might be a CDMA2000 interface, a WLAN interface, a Wideband Code Division Multiple Access interface, a General Packet Data Service interface, a WiMAX interface, a EV-DO interface, and the like.

The memory 420 for stores a permanent home address (HoA), a care-of address (CoA), a pseudo care-of address (pCoA), a virtual home address (VHoA), an expected care-of address (eCoA) which is actually a copy of an eCoA calculated at the CN 120, a virtual home address (eVHoA) which is actually a copy of an eVHoA calculated at the CN 120, a decrypted shared secret key (SKbm), a public key (K+) and a private key (K−) and a sequence value (SQV).

The processor 430 sets a privacy bit (P-bit) and preferably comprises three distinct hashing mechanisms for implementing the algorithms of equations (1), (2) and (3) used in calculating the VHoA, the SQV and copies of the eCoA and eVHoA.

The communication logic 440 acquires the CoA when the MN 110 is in a foreign network. The communication logic also controls sending of the establishment message, the PBT, the update and the BU through the access interface 410, as well as it receives from the access interface 410 the address test, the PBT, the acknowledgement and the BA.

The packet handler 450 sends payload towards the CN 120 through the access interface 410 and receives further payload from the CN 120, also through the access interface 410. The packet handler 450 provides the received payload to the applications 460 and receives from applications 460 payload to be sent towards the CN 120. The applications 460 comprise any applications commonly found on a mobile node and are well-known in the art.

As the MN 110 sets up a session with CN 120, communication logic 440 first determines whether access interface 410 is connected through a home network or a foreign network. If the MN 110 is in a foreign network, communication logic acquires a CoA and stores it in memory 420. In any case, communication logic sets up a pCoA, either equal to the CoA, if present, or to the HoA, and stores it in the memory 420.

Processor 430 then calculates the VHoA, preferably using equation (1), and stores it in memory 420. Processor 430 also sets the P-bit. Communication logic 440 sends an establishment message towards the CN 120, through access interface 410. The establishment message comprises the P-bit, the pCoA and the VHoA.

As an address test message arrives from the CN 120 through the access interface 410, communication logic 440 decodes the message. It requests the processor 430 to provide a SQV. As no previous SQV value is at that time stored in memory 420, processor 430 sets the SQV to any value that complies with a format of a SQV field in an update. Communication logic 440 reads the K+ from memory 420 and requests the access interface 410 to send an update, comprising the P-bit, the pCoA, the VHoA, the SQV and the K+, towards CN 120.

As an acknowledgement arrives from the CN 120 through the access interface 410, communication logic 440 decodes the message. Processor 430 decrypts the SKbm using the K− read from memory 420, and stores the result in memory 420.

The session being now fully set between the MN 110 and the CN 120, packet data is exchanged between the two nodes. The MN 110 receives and sends packet data through the access interface 410. Packet handler 450 processes the received packets and provides the received data to applications 460. Processing in the packet handler 450 may further comprise encrypting outgoing packets and decrypting incoming packets using the SKbm read from memory 420. Applications 460 also provide data to packet handler 450 for sending towards the CN 120 through the access interface 410.

In the event that access interface 410 reports a change of connection towards a serving network, indicative of a change of location for MN 110, communication logic 440 evaluates again whether access interface 410 is now connected through the home network or a new foreign network. If the MN 110 is in the new foreign network, communication logic acquires a new CoA and stores it in memory 420. In any case, communication logic sets up a new pCoA, either equal to the new CoA, if present, or to the HoA, and stores it in the memory 420. Communication logic 440 requests the processor 430 to provide a SQV. Processor 430 reads the SQV value from memory 420 and uses it as a base to compute a new SQV, preferably using equation (2). Communication logic 440 arranges to send a new update towards CN 120, comprising notably the new SQV and the new pCoA. As communication logic 440 detects that an acknowledgement has been received, following the second update, it requests processor 430 to compute a copy of eCoA, preferably using equation (3), and a copy of eVHoA, preferably using equation (4). Processor 430 then stores the copies of eCoA and of eVHoA in memory 420.

Figure 5:
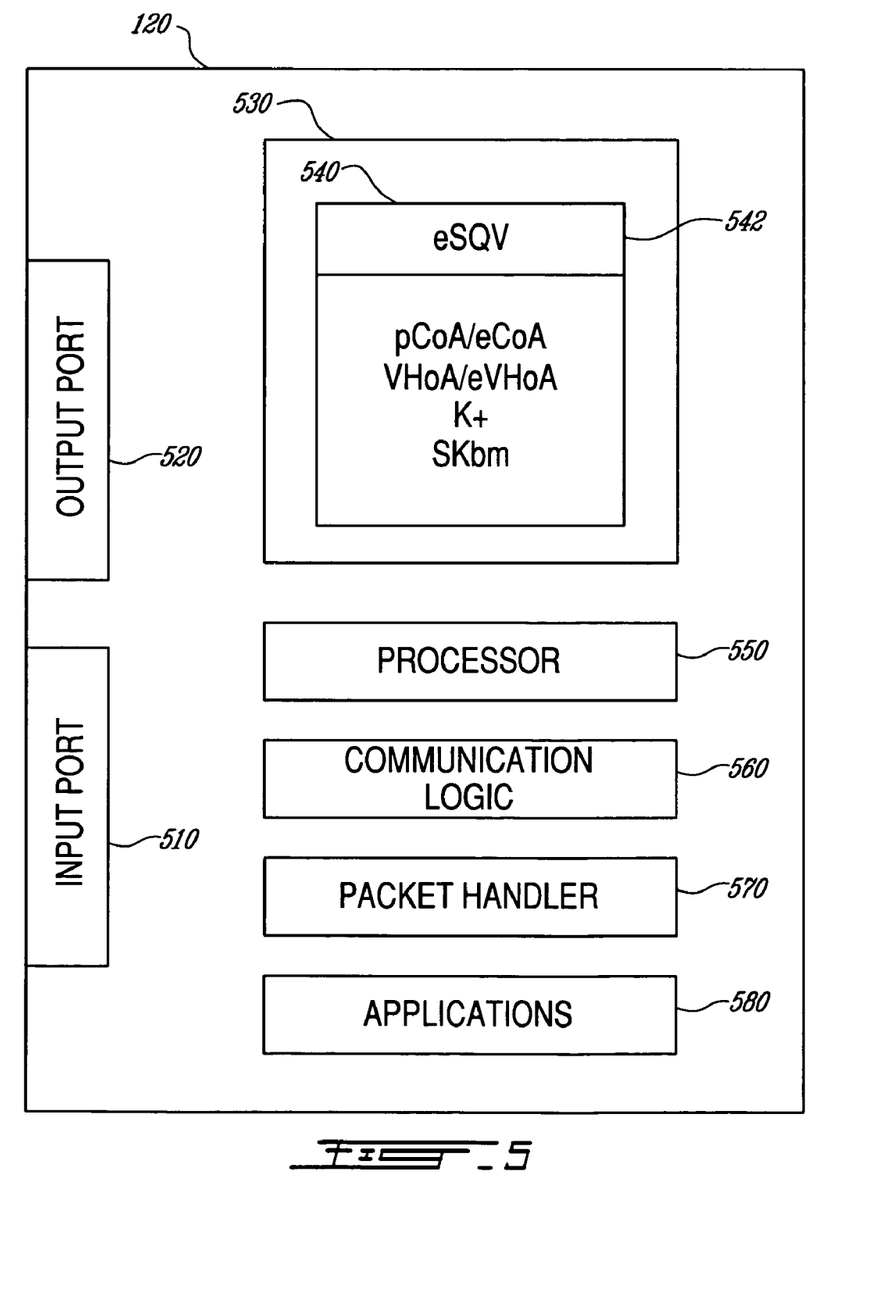
FIG. 5 shows and exemplary correspondent node built according to the present invention.

An exemplary construction of a CN 130 as used in the preceding Figures, will now be described by reference to FIG. 5, which shows and exemplary CN 120 built according to the present invention. The CN 120 may be implemented in hardware, software, or any combination thereof, as is well known in the art. The CN 120 may itself be a mobile node.

The CN 120 comprises an input port 510, an output port 520, a table 530, entries 540 in table 530, a processor 550, a communication logic 560, a packet handler 570 and applications 580.

Input port 510 receives messages such as the establishment message, the update, the PBU or the BU. Output port 520 sends messages such as the address test, the acknowledgement, the PBT or the BA. Depending on the access technology used by the CN 120, the input port 510 and the output port 520 may form one single entity.

Table 530 comprises one entry 540, which may be for example a BCE, for each session with a MN 110. Each table entry comprises an expected sequence value (eSQV), which is also used as a pointer 542 to identify one entry within the entire table 530. Each table entry further comprises a pseudo care-of address (pCoA) which may also take a value of an expected care-of address (eCoA), a virtual home address (VHoA) which may also take a value of an expected virtual home address (eVHoA), a public key (K+) and a shared secret key (SKbm) for the MN 110.

Processor 550 calculates the SKbm and performs authentication of messages. Processor 550 also preferably comprises three distinct hashing mechanisms for implementing the algorithms of equations (2), (3) and (4) used in calculating the eSQV the eCoA and the eVHoA.

The communication logic 560 controls receiving of the establishment message, the PBT, the update and the BU through the input port 510, as well as it sends through the output port 520 the address test, the PBT, the acknowledgement and the BA. To locate one of the entries 540 for handling data received in a message, the communication logic 560 scans through the table 530 and searches for one entry 540 comprising the eSQV that matches, or is equal to, a SQV received as a part of the message.

The packet handler 570 sends payload towards the MN 110 through the output port 520 and receives further payload from the MN 110 through the input port 510. The packet handler 570 provides the received payload to the applications 580 and receives from applications 580 payload to be sent towards the MN 110. The applications 580 comprise any applications commonly found on a correspondent node and are well-known in the art.

As an establishment message is received through input port 510, communication logic 560 detects the presence of a P-bit. Because of the presence of this indicator, communication logic 560 elects not to test a home address field of the establishment message, which comprises the VHoA. Communication logic 560 instructs the output port 520 to send an address test, such as a PBT, towards the MN 110, at an address indicated by a pCoA field of the establishment message.

As an update is received through input port 510, communication logic 560 once again detects the presence of the P-bit. This P-bit indicates that a session is being set up requesting anonymity. It further indicates that a home address field of the update message contains a non-routable VHoA. It also indicates that a sequence number field has been replaced with a SQV that needs to be used as a pointer 542 to identify a table entry for the session. Communication logic 560 instructs processor 550 to authentication the update, using a K+ received in the update. Communication logic 560 further instructs processor 550 to calculate a SKbm. Communication logic 560 then instructs processor 550 to calculate a eSQV, based on the SQV value received in the update, preferably using equation (2). Communication logic then creates an entry 540 in table 530, the entry 540 comprising the eSQV, the SKbm, the K+ and further comprising a pCoA value and a VHoA value received as a part of the update. Communication logic 560 then instructs the output port 520 to send an acknowledgement, such as BA, towards the MN 110, at an address indicated by the pCoA now stored in table entry 540. The acknowledgement further comprises the SKbm.

The session being now fully set between the MN 110 and the CN 120, packet data is exchanged between the two nodes. The CN120 receives packet data through input port 510 and sends packet data through output port 520. Packets are sent towards the MN 110 by use of the pCoA value stored in table entry 540. Packet handler 570 processes the received packets and provides the received data to applications 580. Processing in the packet handler 570 may further comprise encrypting outgoing packets and decrypting incoming packets using the SKbm read from table entry 540. Applications 580 also provide data to packet handler 570 for sending towards the MN 110 through the output port 520.

A further update may be received through input port 510, as a result of a change of location at the CN 110. Communication logic 560 once again detects the presence of the P-bit. Communication logic 560 reads a new SQV value from the update and scans through table 530 to find an entry 540 whose pointer 542 is equal to the newly received SQV. If none is found, this may be indicative of a new session being set up by another mobile node. If however this further update is a result of an attempt by a malicious node to highjack the session, that further update cannot authenticate and the message is ignored.

When the table entry 540 is found, whose pointer 542, consisting of the eSQV previously stored, matches the newly received SQV, communication logic instructs processor 550 to calculate a new eSQV value, based on the previous eSQV value. The new eSQV is stored in table entry 540. Then, communication logic 560 requests processor 550 to calculate an eCoA and a eVHoA, preferably using equations (3) and (4). Communication logic 560 overwrites, in table entry 540, the earlier pCoA with the new eCoA and the earlier VHoA with the new eVHoA. Communication logic 560 then instructs the output port 520 to send an acknowledgement towards the MN 110, at an address indicated by the eCoA now stored in table entry 540.

The session between the MN 110 and the CN 120 continues, packet data now being sent towards the MN 110 by use of the eCoA value stored in table entry 540.

Although several aspects of the preferred embodiment of the method, of the mobile node and of the correspondent node of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

The invention claimed is:

1. A method of providing unlinkability to a mobile node in a session with a correspondent node, the method comprising the steps of:
   receiving a first update from said mobile node at said correspondent node, said first update comprising a first sequence value;
   said first update further comprises a first pseudo care-of address equal to a home address if said mobile node is in a home network for said mobile node or equal to a care-of address if said mobile node is in a foreign network;
   calculating at said correspondent node an expected sequence value based at least in part on said first sequence value, using a first hashing mechanism;
   creating at said correspondent node a table entry for said session, said table entry for storing said expected sequence value and storing said first pseudo care-of address in said table entry;
   receiving from said mobile node at said correspondent node a second update comprising a second sequence value, said second sequence value based at least in part on said first sequence value, using said first hashing mechanism;
   said second update further comprises a second pseudo care-of address equal to said home address if said mobile node is in said home network for said mobile node or equal to a new care-of address if said mobile node is in a new foreign network;
   said second update is sent responsive to a change of a location of said mobile node;
   identifying at said correspondent node said table entry by looking through said table for a match between said expected sequence value and said second sequence value; and
   overwriting said pseudo care-of address with said second pseudo care-of address in said table entry.

2. The method of claim 1, wherein:
   said first sequence value is included in said first pseudo care-of address; and
   said second sequence value is included in said second pseudo care-of address.

3. The method of claim 1, further providing anonymity, wherein:
   said mobile node calculates a virtual home address based at least in part on said first pseudo care-of address;
   said first update further comprises said virtual home address and a privacy indication;
   said step of calculating at said correspondent node said expected sequence value is responsive to said privacy indication in said first update;
   said correspondent node stores said virtual home address in said table entry; and
   said correspondent node uses said first pseudo care-of address and said virtual home address to send packets towards said mobile node until said correspondent node receives said second update.

4. The method of claim 3, further comprising the steps of:
   responsive to said second update comprising said privacy indication, calculating at said correspondent node a further expected sequence value based at least in part on said second sequence value;
   calculating at said correspondent node an expected care-of address, based at least in part on said second pseudo care-of address;
   calculating at said correspondent node an expected virtual home address based at least in part on said expected care-of address;
   updating said table entry by storing said further expected sequence value, said expected care-of address and said expected virtual home address;
   sending a further acknowledgement from said correspondent node towards said mobile node;
   calculating at said mobile node a copy of said expected care-of address, based at least in part on said second pseudo care-of address;
   calculating at said mobile node a copy of said expected virtual home address based at least in part on said copy of said expected care of address; and
   using at said correspondent node said expected care-of address and said expected virtual home address to send packets towards said mobile node until said correspondent node receives said second update.

5. The method of claim 4, further comprising the steps of:
   responsive to said first update, calculating at said correspondent node a shared secret key for said mobile node;
   storing said shared secret key in said table entry;
   sending an acknowledgement from said correspondent node towards said mobile node, said acknowledgement comprising said shared secret key; and storing said shared secret key at said mobile node before sending said second update.

6. The method of claim 5, wherein:
said step of calculating at said correspondent node said expected sequence value further comprises calculating based at least in part on said shared secret key;
said step of calculating at said mobile node said second sequence value further comprises calculating based at least in part on said shared secret key;
said step of calculating at said correspondent node said further expected sequence value further comprises calculating based at least in part on said shared secret key and using said first hashing mechanism;
said step of calculating at said correspondent node said expected care-of address further comprises calculating based at least in part on said shared secret key and using a second hashing mechanism;
said step of calculating at said mobile node said copy of said expected care-of address further comprises calculating based at least in part on said shared secret key and using said second hashing mechanism;
said step of calculating at said mobile node said virtual home address uses a third hashing mechanism;
said step of calculating at said correspondent node said expected virtual home address uses said third hashing mechanism; and
said step of calculating at said mobile node said copy of said expected virtual home address uses said third hashing mechanism.

7. The method of claim 1, wherein:
said correspondent node ignores said second update if said second sequence value does not match any expected sequence value in any table entry.

8. The method of claim 1, wherein:
said update further comprises a public key of said mobile node; and
said correspondent node authenticates said first update based on said public key.

9. A mobile node, comprising:
a memory for storing a first sequence value and a second sequence value;
a processor for calculating said first sequence value, for storing said first sequence value in said memory, for reading said first sequence value from said memory, for calculating said second sequence value by use of a first hashing mechanism, based at least in part on said first sequence value, and for storing in said memory said second sequence value;
an access interface for sending towards a correspondent node a first update comprising said first sequence value and a second update comprising said second sequence value; and
a communication logic for controlling a session with said correspondent node, said communication logic requesting said processor to calculate said first and said second sequence values and requesting said access interface to send said first and said second updates;
wherein:
said access interface is for receiving an acknowledgement from said correspondent node, said acknowledgement comprising a shared secret key;
said processor is for decrypting said shared secret key; and
said memory is for storing said decrypted shared secret key and wherein:
said first hashing mechanism further calculates said second sequence value based at least in part on said shared secret key;
said processor further comprises a second hashing mechanism for calculating a virtual home address based at least in part on a pseudo care-of address;
said processor further comprises a third hashing mechanism for calculating an expected care-of address based at least in part on said pseudo care-of address and based at least in part on said shared secret key; and
said second hashing mechanism is further for calculating an expected virtual home address based at least in part on said expected care-of address.

10. The mobile node of claim 9, wherein:
said communication logic is for controlling sending of said first update upon set up of said session;
said communication logic is for detecting a location change of said mobile node; and
said communication logic is for controlling sending of said second update responsive to said location change.

11. A mobile node, comprising:
a memory for storing a first sequence value and a second sequence value;
a processor for calculating said first sequence value, for storing said first sequence value in said memory, for reading said first sequence value from said memory, for calculating said second sequence value by use of a first hashing mechanism, based at least in part on said first sequence value, and for storing in said memory said second sequence value;
an access interface for sending towards a correspondent node a first update comprising said first sequence value and a second update comprising said second sequence value; and
a communication logic for controlling a session with said correspondent node, said communication logic requesting said processor to calculate said first and said second sequence values and requesting said access interface to send said first and said second updates;
wherein
said communication logic is for controlling sending of said first update upon set up of said session;
said communication logic is for detecting a location change of said mobile node; and
said communication logic is for controlling sending of said second update responsive to said location change; and
wherein:
said communication logic is for determining whether said session is set up through a connection of said access interface to a home network or to a foreign network;
said communication logic is for acquiring a care-of address if said session is being served by said foreign network;
said communication logic is for setting up a pseudo care-of address, said pseudo care-of address being equal to said care-of address if said session is being served by said foreign network, said pseudo care-of address being equal to a home address of said mobile node if said session is being served by said home network; and
said first update comprises said pseudo care-of address.

12. The mobile node of claim 11, wherein:
said communication logic is for setting up a new pseudo care-of address responsive to said location change;
said new pseudo care-of address is equal to a new care-of address if said mobile node is now served by a new foreign network responsive to said location change, said pseudo care-of address is equal to said home address of said mobile node if said session is now served by said home network responsive to said location change; and said second update comprises said new pseudo care-of address.

13. A correspondent node comprising:
an input port for receiving a first update comprising a first pseudo care-of address and a first sequence value, said first update being for a session with a mobile node, and for receiving a second update for said session, said second update comprising a second pseudo care-of address and a second sequence value, wherein said first pseudo care-of address is equal to a home address if said mobile node is in a home network for said mobile node or equal to a care-of address if said mobile node is in a foreign network and wherein said second pseudo care-of address is equal to said home address if said mobile node is in said home network for said mobile node or equal to a new care-of address if said mobile node is in a new foreign network;

a processor for calculating an expected sequence value based at least in part on said first sequence value, using a first hashing mechanism, and for calculating a new expected sequence value based at least in part on said second sequence value;

a table for storing a table entry for said session with said mobile node, wherein said table entry comprises said first address and a pointer for said table entry, said pointer being equal to said expected sequence value, for overwriting in said table entry said pointer with said new expected sequence value, and for overwriting in said table entry said first pseudo care-of address with an expected care-of address based at least in part on said second pseudo care-of address; and a communication logic for controlling said session, said communication logic for looking through said table for an entry comprising a value of said pointer equal to said first sequence value, for creating said table entry if no value of said pointer equal to said first sequence value is found in said table, for requesting said processor to calculate said expected sequence value, for finding said table entry comprising said pointer equal to said second sequence value, and for requesting said processor to calculate said new expected sequence value.

14. The correspondent node of claim 13, wherein:
said processor is for further calculating a shared secret key for said session with said mobile node;
said table entry is for further storing said shared secret key;
said correspondent node further comprises an output port for sending acknowledgements towards said mobile node, responsive to said first and second updates, said acknowledgements comprising said shared secret key.

15. The correspondent node of claim 14, wherein:
said first hashing mechanism calculates said expected sequence values based at least in part on said shared secret key;
said processor further comprises a second hashing mechanism for calculating said expected care-of address based at least in part on said shared secret key;
said processor further comprises a third hashing mechanism for calculating a virtual home address based at least in part on expected care-of address; and
said table entry is for further storing said virtual home address.

16. The correspondent node of claim 14, further comprising:
a packet handler for sending through said output port data packets towards said mobile node using said expected care-of address.

* * * * *